(12) United States Patent
Pitigoi-Aron

(10) Patent No.: US 10,108,511 B2
(45) Date of Patent: Oct. 23, 2018

(54) TEST FOR 50 NANOSECOND SPIKE FILTER

(71) Applicant: QUALCOMM Incorporated, San Diego, CA (US)

(72) Inventor: Radu Pitigoi-Aron, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 272 days.

(21) Appl. No.: 15/179,470

(22) Filed: Jun. 10, 2016

(65) Prior Publication Data

US 2016/0364305 A1    Dec. 15, 2016

Related U.S. Application Data

(60) Provisional application No. 62/175,723, filed on Jun. 15, 2015.

(51) Int. Cl.

| | |
|---|---|
| G06F 11/22 | (2006.01) |
| G06F 13/42 | (2006.01) |
| G06F 13/364 | (2006.01) |
| G06F 13/40 | (2006.01) |
| G06F 1/08 | (2006.01) |
| G06F 11/263 | (2006.01) |

(52) U.S. Cl.
CPC .............. *G06F 11/221* (2013.01); *G06F 1/08* (2013.01); *G06F 11/2289* (2013.01); *G06F 11/263* (2013.01); *G06F 13/364* (2013.01); *G06F 13/404* (2013.01); *G06F 13/4282* (2013.01); *G06F 13/4291* (2013.01)

(58) Field of Classification Search
None
See application file for complete search history.

(56) References Cited

U.S. PATENT DOCUMENTS

| 5,469,476 | A | * | 11/1995 | Liao | ................. | H03K 5/153 |
| | | | | | | 375/238 |
| 5,956,372 | A | * | 9/1999 | Vaman | ................ | H04L 27/00 |
| | | | | | | 375/260 |
| 7,606,955 | B1 | | 10/2009 | Falik et al. | | |
| 2007/0273386 | A1 | * | 11/2007 | Wang | ................. | G11C 5/04 |
| | | | | | | 324/537 |
| 2011/0082955 | A1 | | 4/2011 | Wortham et al. | | |
| 2015/0131492 | A1 | * | 5/2015 | Morris, III | .............. | H03H 7/12 |
| | | | | | | 370/278 |

OTHER PUBLICATIONS

International Search Report and Written Opinion—PCT/US2016/037282—ISA/EPO—dated Sep. 28, 2016.

* cited by examiner

*Primary Examiner* — Michael Sun
(74) *Attorney, Agent, or Firm* — Loza & Loza LLP

(57) ABSTRACT

System, methods and apparatus are described that offer improved performance of an Inter-Integrated Circuit (I2C) bus. A method of testing a spike filter in a legacy I2C device includes generating a command to be transmitted on a serial bus in accordance with an I2C protocol, where the command includes an address corresponding to the legacy slave device, merging the command with a sequence of pulses to obtain a test signal, transmitting the test signal on the serial bus, and determining the efficacy of a spike filter in the first slave device based on whether the legacy slave device acknowledges the test signal. Each pulse in the sequence of pulses has a duration that is less than 50 ns. The spike filter is expected to suppress pulses that have a duration of less than 50 ns.

30 Claims, 14 Drawing Sheets

TEST FOR 50 NANOSECOND SPIKE FILTER

CROSS-REFERENCE TO RELATED APPLICATIONS

This application claims the benefit of U.S. Provisional Application Ser. No. 62/175,723 filed in the U.S. Patent Office on Jun. 15, 2015, the entire content of which being incorporated herein by reference and for all applicable purposes.

BACKGROUND

Field

The present disclosure relates generally to an interface between processors and a peripheral devices and, more particularly, to improving data communications capabilities of a serial bus.

Background

The Inter-Integrated Circuit serial bus, which may also be referred to as the I2C bus or the I²C bus, is a serial single-ended computer bus that was intended for use in connecting low-speed peripherals to a processor. The I2C bus is a multi-master bus in which each device can serve as a master and a slave for different messages transmitted on the I2C bus. The I2C bus can transmit data using only two bidirectional open-drain connectors, including a Serial Data Line (SDA) and a Serial Clock Line (SCL). The connectors typically include signal wires that are terminated by pull-up resistors. Original implementations of I2C supported data signaling rates of up to 100 kilobits per second (100 kbps) in standard-mode (Sm) operation, with more recent standards supporting speeds of 400 kbps in fast-mode (Fm) operation, and 1 megabit per second (Mbps) in fast-mode plus (Fm+) operation.

In some systems and apparatus, however, higher bandwidths are required to support communications between certain types of devices. For example, mobile communications devices such as cellular phones may employ multiple devices, including cameras, displays and various communications interfaces that consume significant bandwidth. Higher bandwidths may be difficult to obtain when mixed signaling, including signaling according to conventional I2C protocols, is to be used in order to maintain compatibility with legacy devices. For example, it may be difficult to determine whether I2C devices can coexist on a serial bus that is used by enhanced devices to transmit data and commands at higher bit rates than the I2C devices can handle. Accordingly, there exists an ongoing need for providing optimized communications on serial interfaces configured as a bus connecting master and slave components within a mobile device.

SUMMARY

Embodiments disclosed herein provide systems, methods and apparatus that can determine whether legacy I2C devices can coexist with enhanced devices on a common serial bus. In one example, a spike filter is tested to determine whether the spike filter can suppress a sequence of pulses that have a duration of less than 50 nanoseconds (50 ns).

In various aspects of the disclosure, a method of data communications may be performed by a master device. The method includes generating a command to be transmitted on a serial bus in accordance with an I2C protocol, where the command includes an address corresponding to a first slave device, merging the command with a sequence of pulses to obtain a test signal, transmitting the test signal on the serial bus, and determining the efficacy or effectiveness of a spike filter in the first slave device based on whether the first slave device acknowledges the command. Each pulse in the sequence of pulses has a duration that is less than 50 ns. The spike filter is expected to suppress pulses that have a duration of less than 50 ns.

In one aspect, the first slave device responds correctly to the command by acknowledging the command. The master device may receive an acknowledgement from the slave device in response to the command. The acknowledgement may be an indication that the spike filter in the first slave device is operating effectively.

In one aspect, determining the efficacy of the spike filter includes causing a first value to be written to a register of the first slave device, and reading a second value from the register in the first slave device. The master device may determine that the spike filter is effective when the first value equals the second value.

In some aspects, the master device may determine presence of the first slave device by transmitting the command at one or more clock frequencies without the sequence of pulses. The first slave device may be configured to acknowledge the command when the first device is present on the serial bus and adapted for communicating using at least one of the one or more clock frequencies. The test signal may be transmitted at a clock frequency corresponding to a lowest frequency of the one or more clock frequencies.

In one aspect, the master device may merge the command with the sequence of pulses by merging the sequence of pulses into each of a plurality of intervals when a clock signal transmitted on the serial bus is in a low state.

In another aspect, the master device may merge the command with the sequence of pulses by merging the sequence of pulses into each of a plurality of intervals when a clock signal transmitted on the serial bus is in a high state.

In various aspects, each pulse comprises a 40 nanosecond period of time during which the pulse is in a high state. The sequence of pulses is transmitted on a serial clock line of the serial bus or on a serial data line of the serial bus.

In various aspects of the disclosure, an apparatus coupled to a serial bus includes means for generating a command to be transmitted on the serial bus in accordance with an I2C protocol, where the command includes an address corresponding to a first slave device, means for merging the command with a sequence of pulses to obtain a test signal, means for transmitting the test signal on the serial bus, and means for determining the efficacy or effectiveness of a spike filter in the first slave device based on whether the first slave device acknowledges the command. Each pulse in the sequence of pulses has a duration that is less than 50 ns. The spike filter is expected to suppress pulses that have a duration of less than 50 ns.

In various aspects of the disclosure, an apparatus for detecting capabilities of devices coupled to a serial bus includes a processing system configured to generate a command to be transmitted on the serial bus in accordance with an I2C protocol, where the command includes an address corresponding to a first slave device, merge the command with a sequence of pulses to obtain a test signal, where each pulse in the sequence of pulses has a duration that is less than 50 ns, transmit the test signal on the serial bus, and determine the efficacy or effectiveness of a spike filter in the first slave device based on whether the first slave device responds correctly to the command. The spike filter may be expected to suppress pulses that have a duration of less than 50 ns.

In various aspects of the disclosure, a processor-readable storage medium is disclosed. The storage medium may be a non-transitory storage medium and may store code that can be executed by one or more processors. In various examples, the processor-readable storage medium has code for generating a command to be transmitted on the serial bus in accordance with an Inter-Integrated Circuit (I2C) protocol, where the command includes an address corresponding to a first slave device, merging the command with a sequence of pulses to obtain a test signal, where each pulse in the sequence of pulses has a duration that is less than 50 ns, transmitting the test signal on the serial bus, and determining the efficacy or effectiveness of a spike filter in the first slave device based on whether the first slave device responds correctly to the command. The spike filter may be expected to suppress pulses that have a duration of less than 50 ns.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Certain aspects of the invention may be applicable to communications links deployed between electronic devices that are subcomponents of a mobile apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similarly functioning device.

Figure 1:
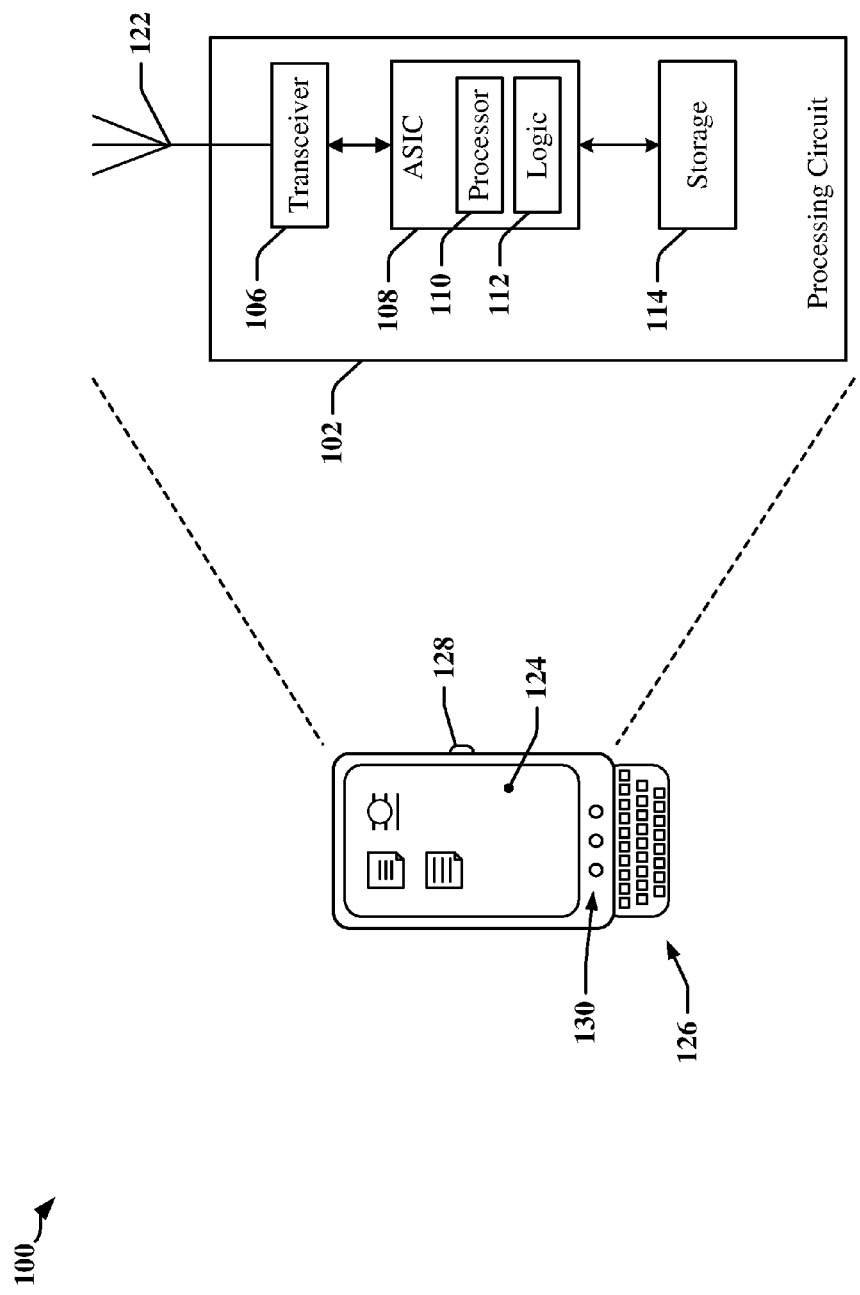
FIG. 1 depicts an apparatus employing a data link between integrated circuit (IC) devices that selectively operates according to one of plurality of available standards.

FIG. 1 illustrates an apparatus 100 that may employ a communication link between IC devices. In one example, the apparatus 100 may operate as a communication device that uses a radio frequency (RF) radio and/or transceiver 106 to communicate with a radio access network (RAN), a core access network, the Internet and/or another network. The transceiver 106 may be embodied in, or operably coupled to a processing circuit 102. The processing circuit 102 may include one or more IC devices, such as an application-specific IC (ASIC) 108. The ASIC 108 may include one or more processing devices 110, logic circuits 112, and so on. The processing circuit 102 may include and/or be coupled to processor-readable storage media 114 such as a memory device that can store and maintain data and instructions for execution or for other use by the processing circuit 102. The processing circuit 102 may be controlled by an operating system, and an application programming interface (API) layer may be provided to support and enable execution of software modules residing in the storage media 114. The storage media 114 may comprise ROM or RAM, EEPROM, flash cards, and/or any memory device that can be used in processing systems and computing platforms. The processing circuit 102 may include or access a local database that can maintain operational parameters and other information used to configure and operate the apparatus 100. A local database may be implemented using one or more of a database module, flash memory, magnetic media, EEPROM, optical media, tape, soft or hard disk, or the like. The processing circuit may also be operably coupled to other devices such as an antenna 122, a display 124, operator controls, such as a button 128 and a keypad 126 among other components.

Figure 2:
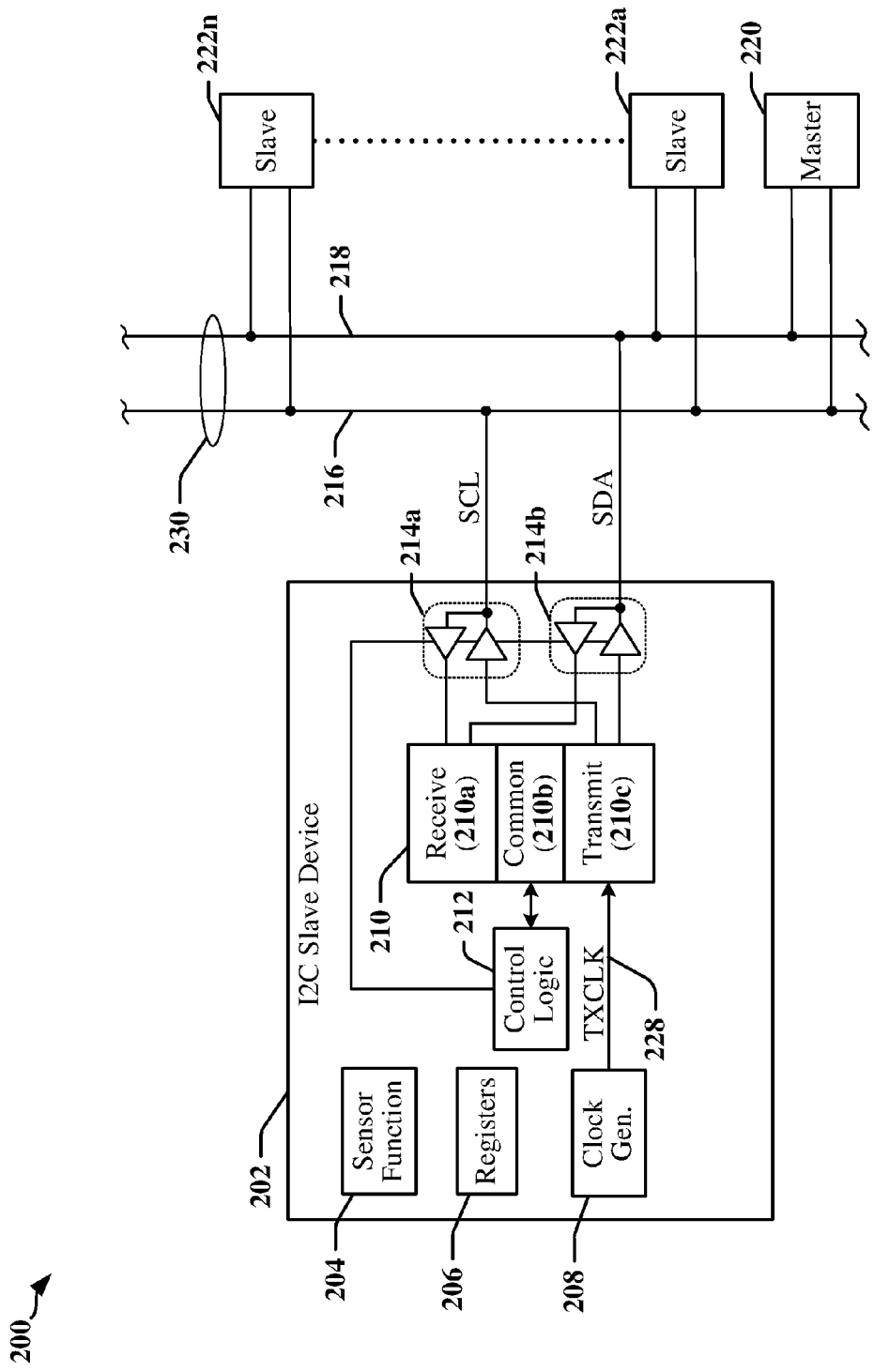
FIG. 2 illustrates certain aspects of an apparatus connected to an I2C communications bus.

FIG. 2 is a block schematic drawing illustrating certain aspects of an apparatus 200 that includes multiple devices 202, 220 and 222a-222n connected to a shared bus, such as a serial bus 230. The apparatus 200 may be embodied in a mobile processing/communication device, for example. The apparatus 200 includes devices 202, 220 and 222a-222n that communicate using the serial bus 230. In some implementations, the serial bus 230 supports one or more protocols, which may include an I2C protocol. In one example, a slave device 202, 222a-222n coupled to the serial bus 230 includes or is coupled to a sensor. In another example, a slave device 202 includes a sensor control function 204 that manages or communicates with a sensor. The sensor may be an environmental sensor, a position location sensor, a motion sensor, or the like. In another example, the slave device 202 may be an imaging device that includes an imaging sensor. The slave device 202 may include configuration registers 206, control logic 212, a transceiver 210 and line drivers/receivers 214a and 214b. The control logic 212 may include a processor such as a state machine, sequencer, signal processor or general-purpose processor. The transceiver 210 may include a receiver 210a, a transmitter 210c and common circuits 210b, including timing, logic and storage circuits and/or devices. In one example, the transmitter 210c encodes and transmits data based on timing provided by a clock generation circuit 208.

Two or more of the devices 202, 220 and/or 222a-222n may be adapted according to certain aspects and features disclosed herein to extend the bandwidth and other capabilities provided by a shared bus operating according to conventional I2C protocols. In one example, the devices 202, 220 and/or 222a-222n may be adapted to support a protocol that is a derivative of, or different from an I2C protocol. In another example, the devices 202, 220 and/or 222a-222n may be adapted to support a higher bit rate using than can ordinarily be achieved when conventional I2C protocols are used to manage communications on the serial bus 230. The I2C protocols may conform to de facto I2C standards and may include specifications defining electrical and timing aspects of I2C signals, in addition to data formats and I2C bus control and timing.

Figure 3:
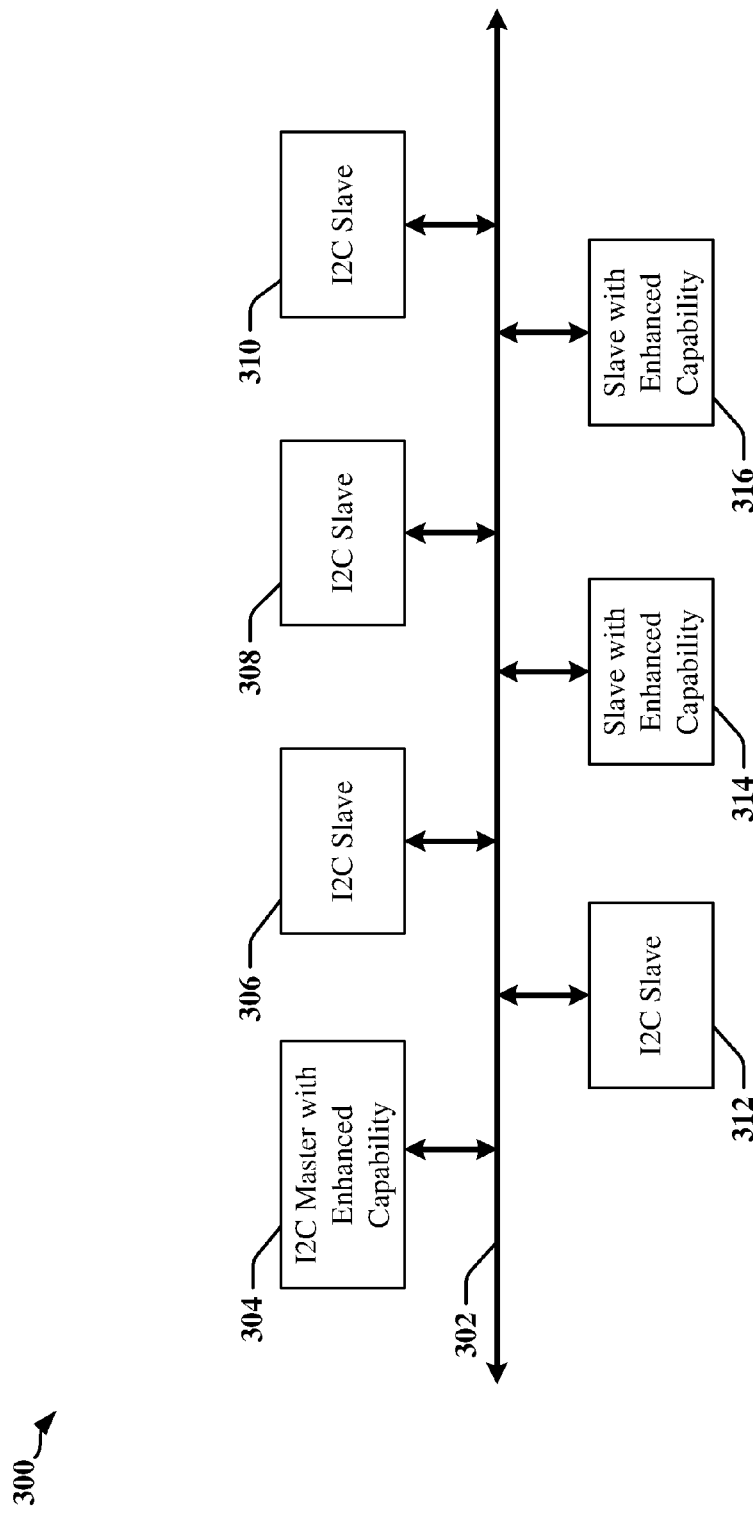
FIG. 3 illustrates a configuration of I2C connected to a common serial bus.

FIG. 3 illustrates a configuration of devices 304, 306, 308, 310, 312, 314 and 316 connected to a serial bus 302, whereby three enhanced devices 304, 314 and 316 are adapted or configured to obtain higher data transfer rates over the serial bus 302. The enhanced devices 304, 314 and 316 may coexist with conventionally configured I2C devices 306, 308, 310 and 312. The enhanced devices 304, 314 and 316 may alternatively or additionally communicate using conventional I2C protocols, as desired or needed.

The serial bus 302 may be operated at higher data transfer rates when an enhanced master device 304 operates as the bus master that controls the serial bus 302. In the depicted example, a single master device 304 may serve as a bus master in I2C mode and in an enhanced mode that supports a data transfer rate that exceeds the data transfer rate achieved when the serial bus 302 is operated according to a conventional I2C protocol. The signaling used for higher data-rate traffic may take advantage of certain features of I2C protocols such that the higher data-rate traffic can be carried over the serial bus 302 without compromising the functionality of legacy I2C devices 306, 308, 310 and 312 coupled to the serial bus 302.

Figure 4:
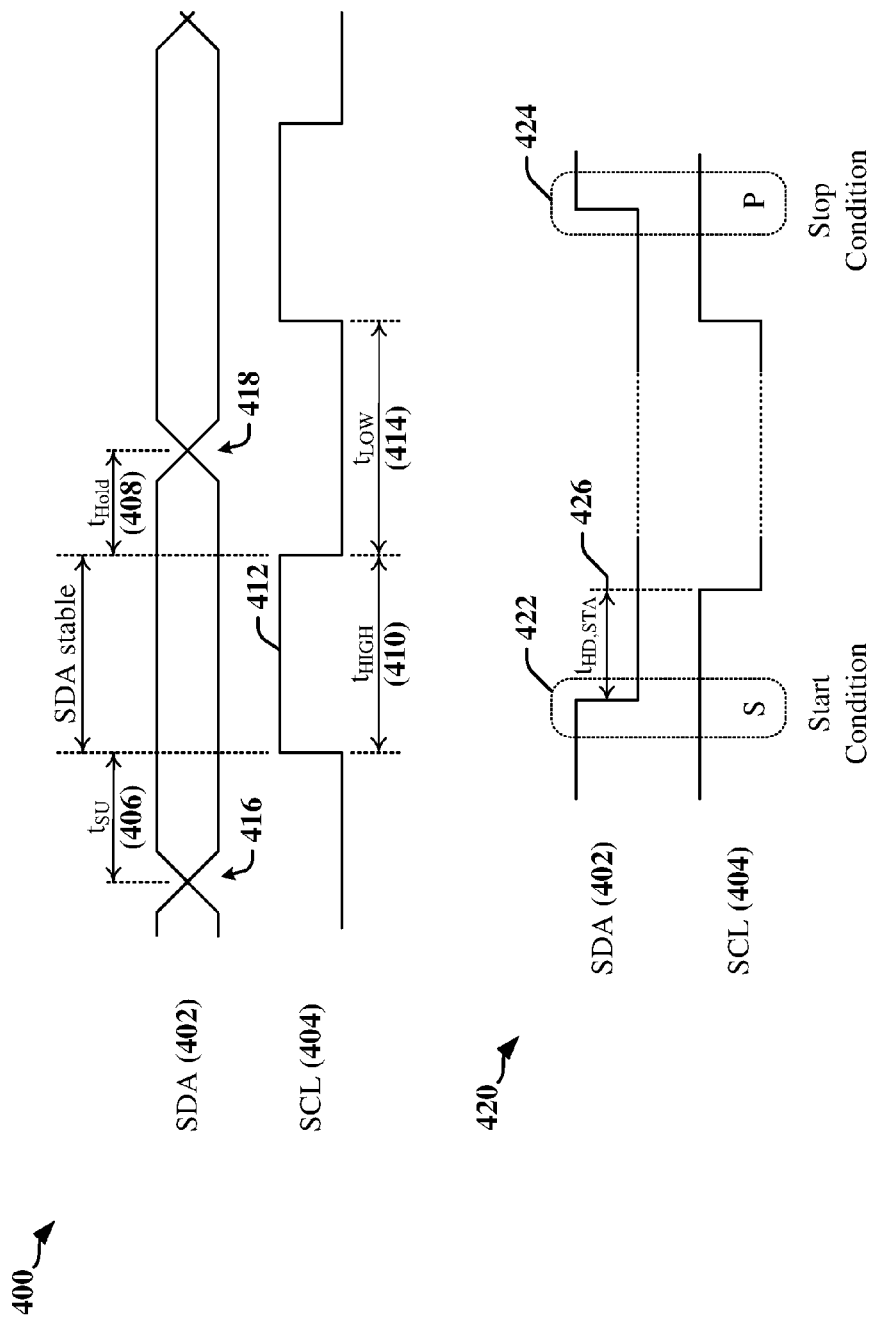
FIG. 4 illustrates certain aspects of the timing relationship between SDA and SCL wires on a conventional I2C bus.

FIG. 4 includes timing diagrams 400 and 420 that illustrate the relationship between the SDA wire 402 and the SCL wire 404 on a conventional I2C bus. The first timing diagram 400 illustrates the timing relationship between the SDA wire 402 and the SCL wire 404 while data is being transferred on the conventionally configured I2C bus. The SCL wire 404 provides a series of pulses that can be used to sample data in the SDA wire 402. The pulses (including the pulse 412, for example) may be defined as the time during which the SCL wire 404 is determined to be in a high logic state at a receiver. When the SCL wire 404 is in the high logic state during data transmission, data on the SDA wire 402 is required to be stable and valid; the state of the SDA wire 402 is not permitted to change when the SCL wire 404 is in the high logic state.

Specifications for conventional I2C protocol implementations (which may be referred to as "I2C Specifications") define a minimum duration 410 ($t_{HIGH}$) of the high period of the pulse 412 on the SCL wire 404. The I2C Specifications also define minimum durations for a setup time 406 ($t_{SU}$) before occurrence of the pulse 412, and a hold time 408 ($t_{Hold}$) after the pulse 412 terminates. The signaling state of the SDA wire 402 is expected to be stable during the setup time 406 and the hold time 408. The setup time 406 defines a maximum time period after a transition 416 between signaling states on the SDA wire 402 until the arrival of the rising edge of the pulse 412 on the SCL wire 404. The hold time 408 defines a minimum time period after the falling edge of the pulse 412 on the SCL wire 404 until a next transition 418 between signaling states on the SDA wire 402. The I2C Specifications also define a minimum duration 414 for a low period ($t_{LOW}$) for the SCL wire 404. The data on the SDA wire 402 is typically stable and/or can be captured for the duration 410 ($t_{HIGH}$) when the SCL wire 404 is in the high logic state after the leading edge of the pulse 412.

The second timing diagram 420 of FIG. 4 illustrates signaling states on the SDA wire 402 and the SCL wire 404 between data transmissions on a conventional I2C bus. The I2C protocol provides for transmission of 8-bit data (bytes) and 7-bit addresses. A receiver may acknowledge transmissions by driving the SDA wire 402 to the low logic state for one clock period. The low signaling state represents an acknowledgement (ACK) indicating successful reception and a high signaling state represents a negative acknowledgement (NACK) indicating a failure to receive or an error in reception.

A start condition 422 is defined to permit the current bus master to signal that data is to be transmitted. The start condition 422 occurs when the SDA wire 402 transitions from high to low while the SCL wire 404 is high. The I2C bus master initially transmits the start condition 422, which may be also be referred to as a start bit, followed by a 7-bit address of an I2C slave device with which it wishes to exchange data. The address is followed by a single bit that indicates whether a read or write operation is to occur. The addressed I2C slave device, if available, responds with an ACK bit. If no I2C slave device responds, the I2C bus master may interpret the high logic state of the SDA wire 402 as a NACK. The master and slave devices may then exchange bytes of information in frames, in which the bytes are serialized such that the most significant bit (MSB) is transmitted first. The transmission of the byte is completed when a stop condition 424 is transmitted by the I2C master device. The stop condition 424 occurs when the SDA wire 402 transitions from low to high while the SCL wire 404 is high. The I2C Specifications require that all transitions of the SDA wire 402 occur when the SCL wire 404 is low, and exceptions may be treated as a start condition 422 or a stop condition 424.

Figure 5:
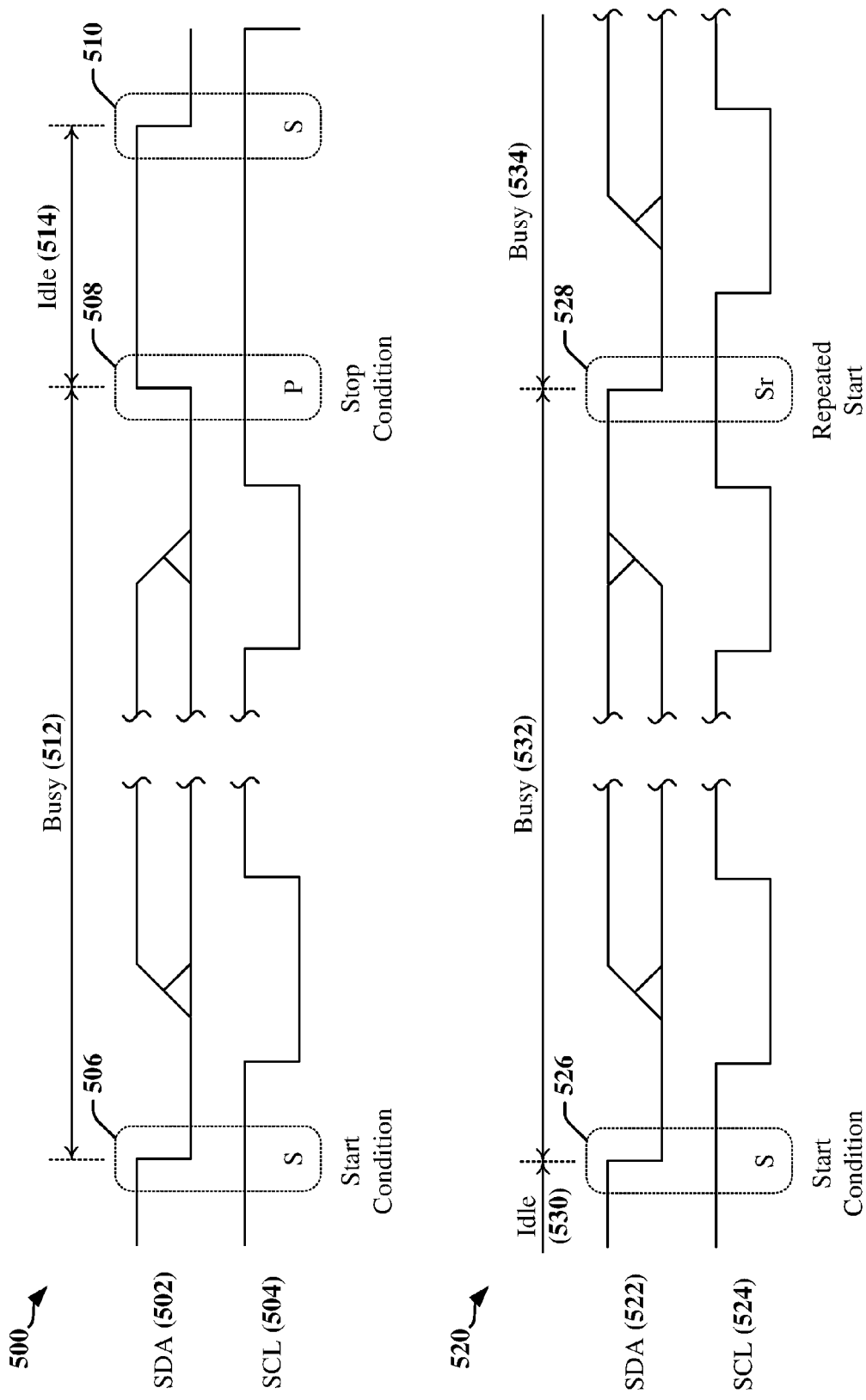
FIG. 5 is a timing diagram that illustrates timing associated with multiple frames transmitted on an I2C bus.

FIG. 5 includes diagrams 500 and 520 that illustrate timing associated with data transmissions on an I2C bus. As illustrated in the first diagram 500, an idle period 514 may occur between a stop condition 508 and a consecutive start condition 510. This idle period 514 may be prolonged, and may result in reduced data throughput when the conventional I2C bus remains idle between the stop condition 508 and the consecutive start condition 510. In operation, a busy period 512 commences when the I2C bus master transmits a first start condition 506, followed by data. The busy period 512 ends when the I2C bus master transmits a stop condition 508 and the idle period 514 ensues. The idle period 514 ends when a second start condition 510 is transmitted.

The second timing diagram 520 illustrates a method by which the number of occurrences of an idle period 514 may be reduced. In the illustrated example, data is available for transmission before a first busy period 532 ends. The I2C bus master device may transmit a repeated start condition 528 (Sr) rather than a stop condition. The repeated start condition 528 terminates the preceding data transmission and simultaneously indicates the commencement of a next data transmission. The state transition on the SDA wire 522 corresponding to the repeated start condition 528 is identical to the state transition on the SDA wire 522 for a start condition 526 that occurs after an idle period 530. For both the start condition 526 and the repeated start condition 528, the SDA wire 522 transitions from high to low while the SCL wire 524 is high. When a repeated start condition 528 is used between data transmissions, a first busy period 532 is immediately followed by a second busy period 534.

Figure 6:
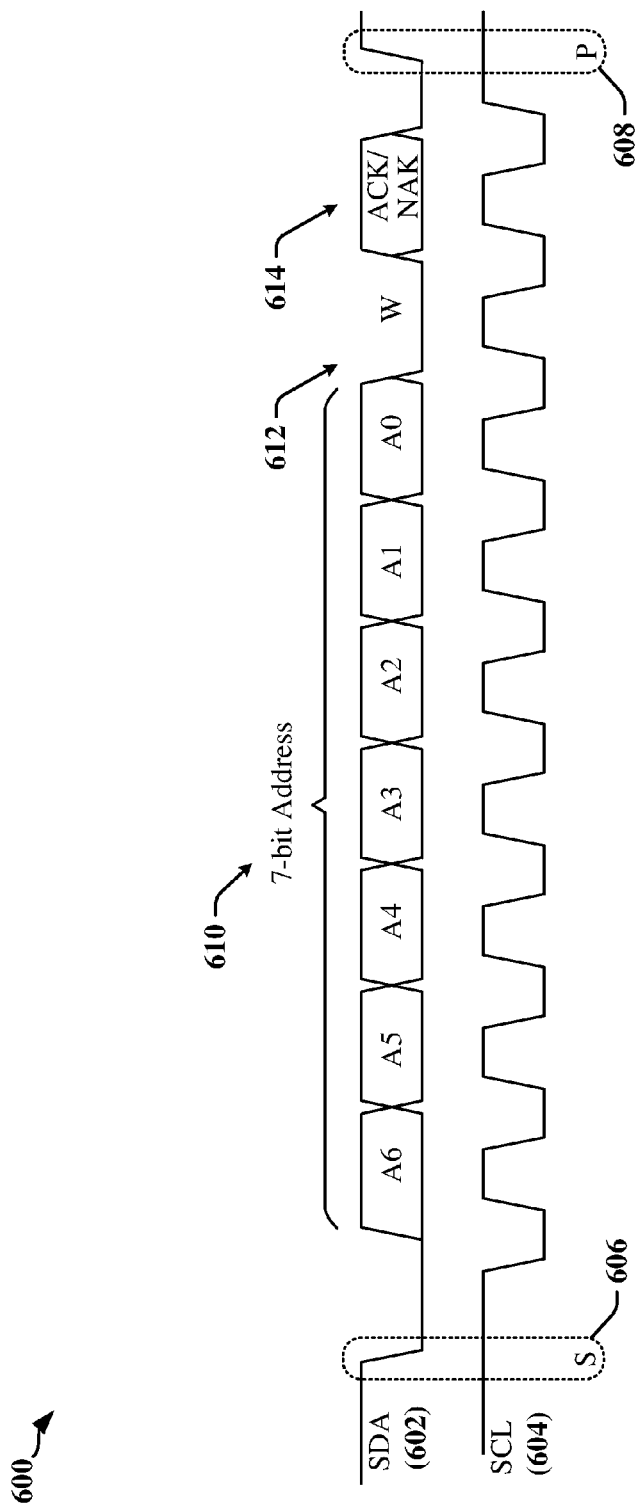
FIG. 6 illustrates timing related to a command word sent to a slave device in accordance with I2C protocols.

FIG. 6 is a diagram 600 that illustrates an example of the timing associated with a command word sent to a slave device in accordance with I2C protocols. In the example, a master device initiates the transaction with a start condition 606, whereby the SDA wire 602 is driven from high to low while the SCL wire remains high. The master device then transmits a clock signal on the SCL wire 604. The seven-bit address 610 of a slave device is then transmitted on the SDA wire 602. The seven-bit address 610 is followed by a Write/Read command bit 612, which indicates "Write" when low and "Read" when high. The slave device may respond in the next clock interval 614 with an acknowledgment (ACK) by driving the SDA wire 602 low. If the slave device does not respond, the SDA wire 602 is pulled high and the master device treats the lack of response as a NACK. The master device may terminate the transaction with a stop condition 608 by driving the SDA wire 602 from low to high while the SCL wire 604 is high. This transaction can be used to determine whether a slave device with the transmitted address coupled to the I2C bus is in an active state.

With continued reference to FIG. 3, certain aspects relate to implementations in which provide higher data rates between enhanced devices 304, 314, 316 that are higher than data rates supported by I2C protocols. For example, the increased data rates for communication between enhanced devices 304, 314, 316 coupled to the serial bus 302 may be achieved by increasing clock rates on the serial bus 302. Legacy I2C devices 306, 308, 310, 312 may be unable to handle the increased clock frequencies and/or may misinterpret signaling transmitted between enhanced devices 304, 314, 316. According to certain aspects, increased data rates for communication between enhanced devices 304, 314, 316 may be achieved using shortened pulse widths on the clock signal. Pulses with shortened pulse widths may be ignored by legacy I2C devices 306, 308, 310, 312 due to the presence of spike filters in the receivers of the legacy I2C devices 306, 308, 310, 312.

Figure 7:
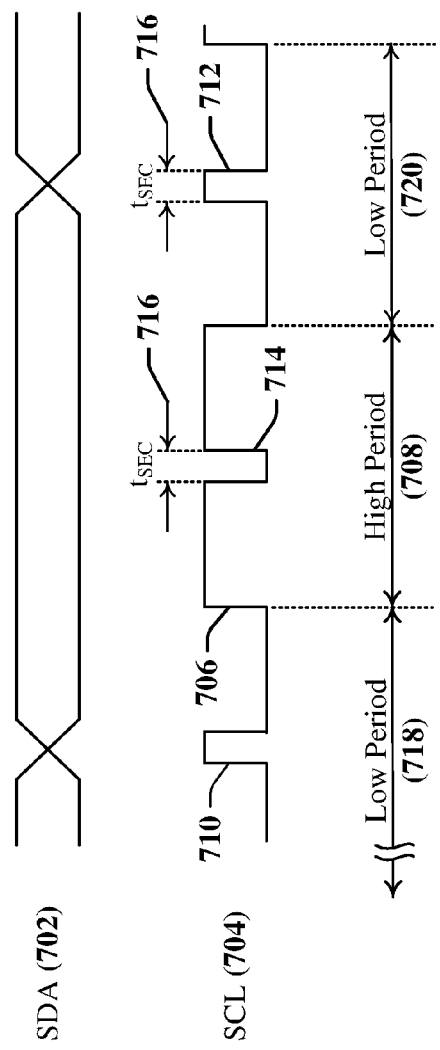
FIG. 7 illustrates the timing of pulses that may be filtered by I2C devices.

FIG. 7 is a timing diagram 700 that illustrates the timing of pulses that may be filtered by legacy I2C devices 306, 308, 310, 312. The SCL wire 704 may carry one or more pulses 706 that conform or comply with I2C protocols. That is, the pulses 706 have a high period 708 of a duration that exceeds the minimum duration specified for a pulse by the I2C protocol. The low period 718 preceding the pulse and the low period 720 following the pulse have durations that exceed the minimum low duration specified by the I2C protocol. In the timing diagram 700, short positive transitioning pulses 710 and 712 may be filtered by a spike filter provided in the receiver of the legacy I2C devices 306, 308, 310, 312. The spike filter may also filter the short negative transitioning pulse 714.

The I2C Specifications define a pulse width for a spike ($t_{SP}$) that must be suppressed by an input filter of a conventional I2C receiver in certain modes of operation. In one example, $t_{SP}$=50 ns, and a pulse having a duration that is less than 50 ns is expected to be blocked by an I2C compliant spike filter. Applying this example to FIG. 7, any of the pulses 710, 712, 714 that are shorter than 50 ns are expected to be filtered and ignored by conventional I2C receivers. Enhanced devices 304, 314, 316 may communicate by transmitting pulses with a duration ($t_{SEC}$) that is less than the $t_{SP}$ pulse width on the SDA wire 702 and/or SCL wire 704, where $t_{SP}$ is specified by the I2C Specifications.

With reference also to FIG. 4, minimum durations of the durations 410, 414 of the High and Low logic states of the SDA wire 402 and SCL wire 404 are defined in the I2C Specifications for certain modes of operation. In the example of Fm operation, the duration 410 of each logic High period must be greater than 0.6 μs, and the duration 414 of each logic Low period ($t_{LOW}$) must be greater than 1.3 μs, with no maximum values specified.

Figure 8:
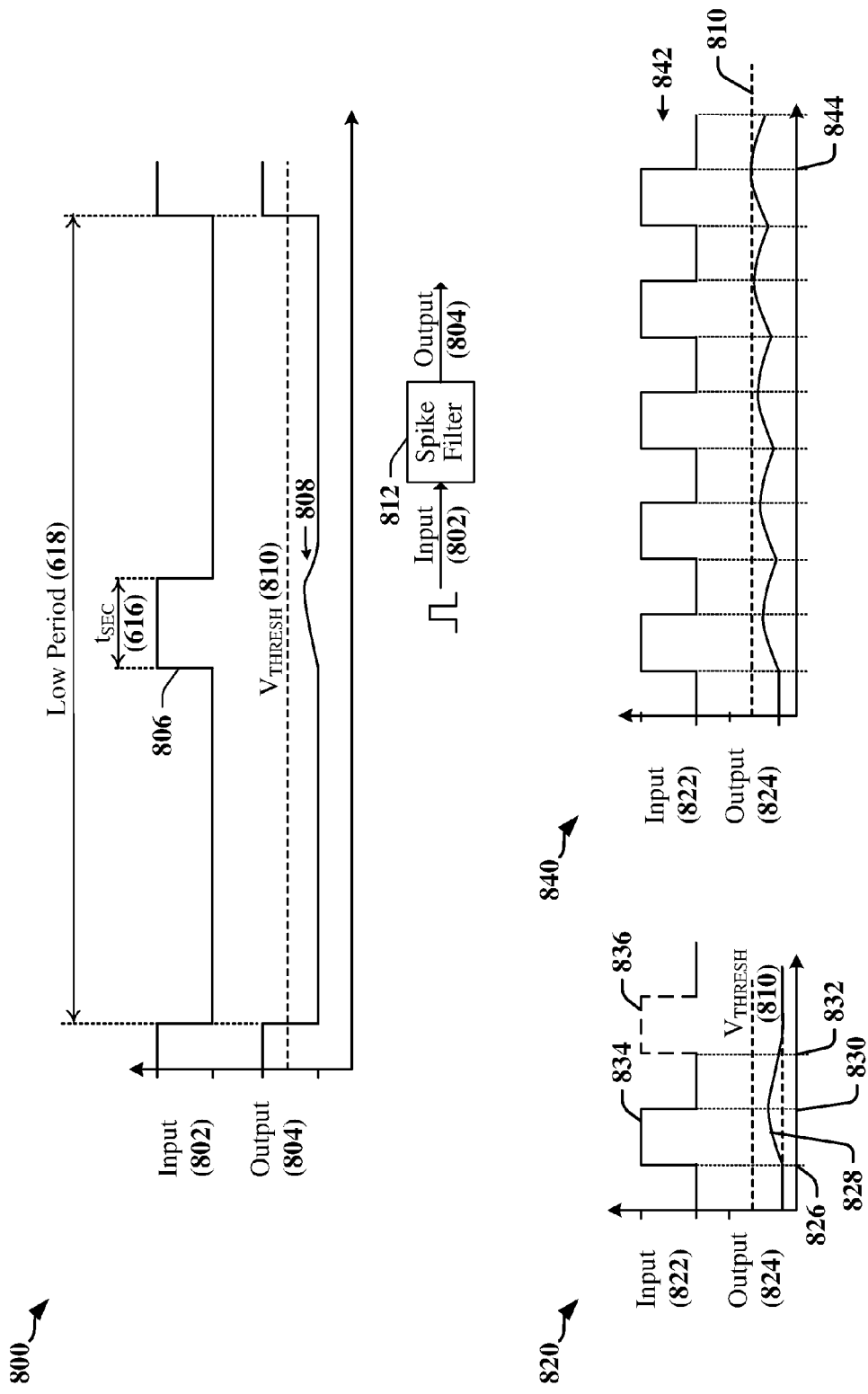
FIG. 8 illustrates certain aspects associated with the operation of a spike filter in a legacy I2C device.

FIG. 8 illustrates certain aspects associated with the operation of a spike filter 812 in a legacy I2C device 306, 308, 310, 312. The first diagram 800 illustrates an input signal 802 provided to the spike filter 812, and an example of the resultant output signal 804. The input signal 802 includes a short pulse 806 that has a duration 616 that is less than the $t_{SP}$ pulse width. The spike filter 812 operates to prevent the short pulse 806 from appearing in the output signal 804. In some instances, the spike filter 812 is implemented as a resistor-capacitor circuit (RC circuit), and the output signal 804 may include a residual component 808 of the short pulse 806. The residual component 808 may reach a voltage level that is below a detection threshold voltage 810, and therefore is not detected by the receiver of the legacy I2C device 306, 308, 310, 312. The residual component 808 may include a period of time during which the voltage of the output signal 804 increases followed by a period of time when the voltage of the output signal 804 decreases or decays back to 0 V. The combination of the maximum voltage and the delay time may cause issues for a legacy I2C device 306, 308, 310, 312.

In the example illustrated by the timing diagram 820, a residual component 828 on the output signal 824 may be characterized by a rising voltage commencing at time 826 corresponding to the leading edge of a first short pulse 834, a peak voltage level at a time 830 corresponding to the falling edge of the first short pulse 834, and a slow decay toward 0 V. As illustrated in the timing diagram 820, the voltage of the output signal 824 may not reach 0 V before the time 832 at which a leading edge of a second short pulse 836 arrives.

The timing diagram 840 illustrates the cumulative effect of residual voltages from previous short pulses when the short pulses are tightly spaced. In this example, a series of pulses 842 are spaced such that the output signal 824 does not return to 0 V between successive pulses. For each pulse after the initial pulse, the voltage of the output signal 824 increases from a voltage above 0 V and after several pulses the voltage of the output signal 824 may attain a maximum voltage that exceeds the detection threshold voltage 810 at a time 844. In these circumstances, a legacy I2C device 306, 308, 310, 312 may determine that a transition has occurred, with undeterminable consequences.

In accordance with certain aspects disclosed herein, an I2C master device 304 with enhanced capability may be configured to test the spike filters of legacy I2C devices 306, 308, 310, 312 to ensure that the spike filters are capable of handling the signaling rate used to communicate between enhanced devices 304, 314, 316. In one example, the master device 304 may transmit a command according to an I2C protocol while short pulses are transmitted on the SCL wire of the bus. The short pulses may be transmitted with minimum separation such that a poorly performing spike filter 812 may not prevent transitions from being detected by a legacy I2C device 306, 308, 310, 312.

Figure 9:
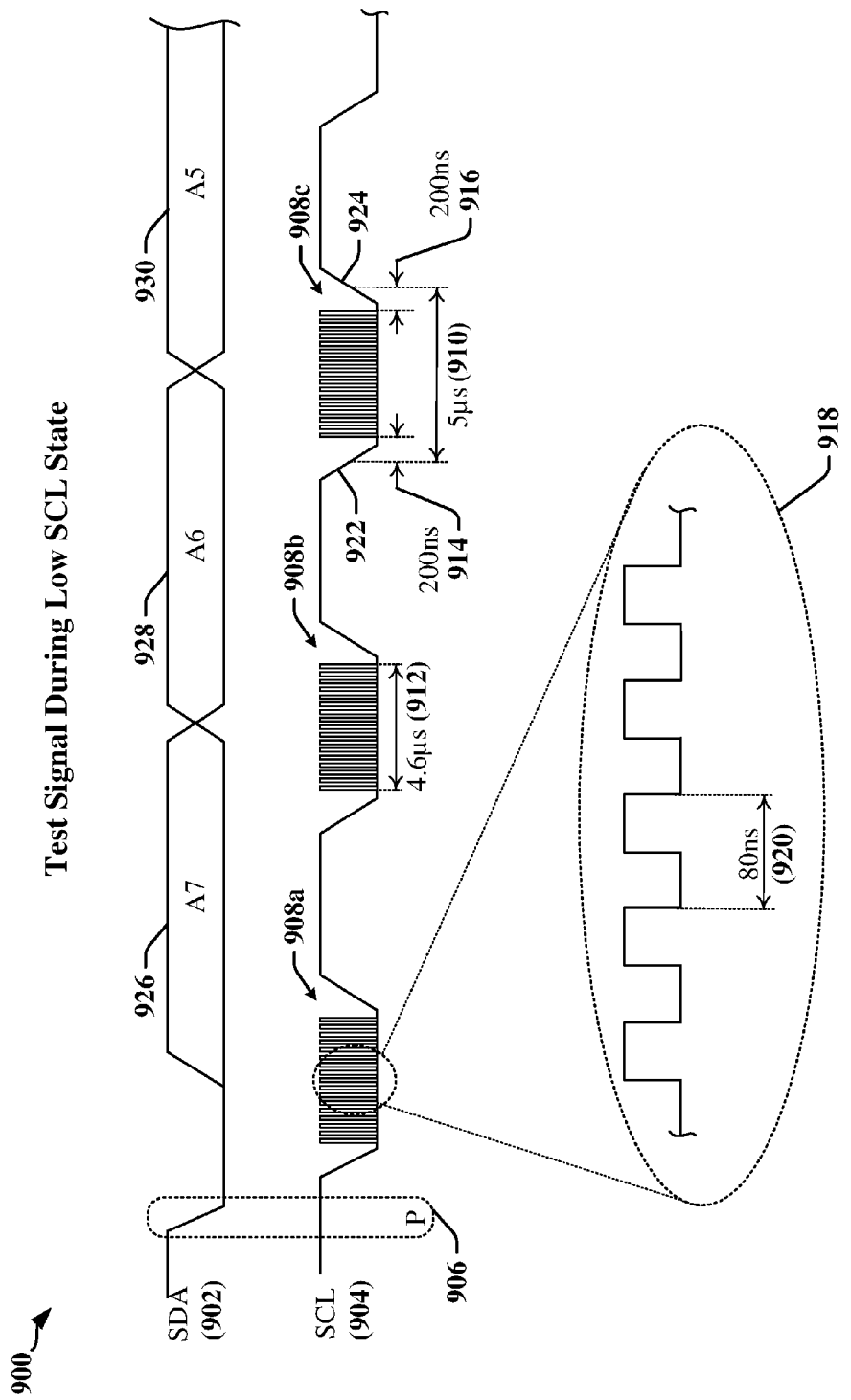
FIG. 9 illustrates a first example of a test transmission in accordance with certain aspects disclosed herein.

FIG. 9 is a timing diagram 900 illustrating a first example of a test transmission sent by the master device 304 in order to determine the capabilities, efficacy and/or effectiveness of a spike filter in one or more legacy I2C devices 306, 308, 310, 312 coupled to the master device 304 through a serial bus 302. In this example, the command word illustrated in FIG. 6 is transmitted by the master device 304, and a portion of the command word is illustrated in the timing diagram 900. After a start condition 906 has been transmitted by the master device 304, address bits 926, 928, 930 are transmitted on the SDA wire 902, and a series of short pulses 908a, 908b, 908c may be transmitted on one or more occasions when the SCL wire 904 is in a low logic state. For example, and as illustrated in the expanded view 918, the short pulses may each have a duration of 40 ns and may be separated by a 40 ns low period yielding a clock period 920 of 80 ns.

The SCL wire 904 may be permitted to settle before a series of short pulses 908a, 908b, 908c is transmitted. For example, after an I2C transition 922 from a high logic state, the SCL wire 904 may remain in the low logic state for a first period of time 914 before the series of short pulses 908c is transmitted. The duration of the first period of time 914 may be determined by I2C specifications and may be defined as 200 ns, for example. The series of short pulses 908c may be terminated before a next I2C transition 924 from the low logic state to the high logic state. The SCL wire 904 remains in the low logic state for a second period of time 916 before the next I2C transition 924 occurs. The duration of the second period of time 916 may be determined by I2C specifications and may, in one example, be defined as 200 ns.

A functioning spike filter coupled to the SCL wire 904 suppresses each series of short pulses 908a, 908b, 908c and the output of the spike filter includes only the I2C transitions (e.g., the transitions 922, 924). In the example illustrated in FIG. 9, the output of an effective spike filter coupled to the SCL wire 904 is approximately a square wave with a period of 10 µs.

Figure 10:
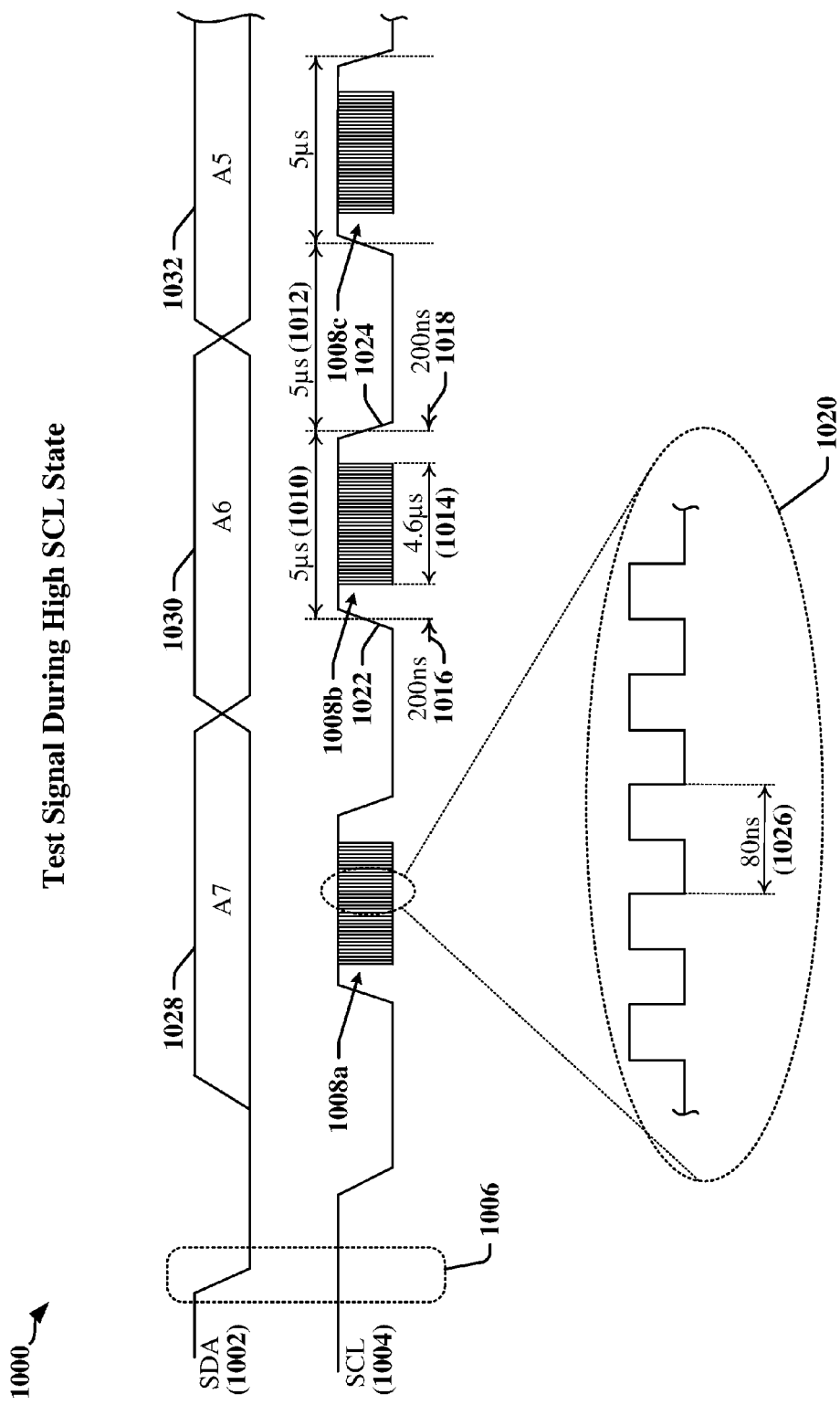
FIG. 10 illustrates a second example of a test transmission in accordance with certain aspects disclosed herein.

FIG. 10 is a timing diagram 1000 illustrating a second example of a test transmission sent by the master device 304 in order to determine the capabilities, efficacy and/or effectiveness of a spike filter in one or more legacy I2C devices 306, 308, 310, 312 coupled to the master device 304 through a serial bus 302. In this example, the command word illustrated in FIG. 6 is transmitted by the master device 304, and a portion of the command word is illustrated in the timing diagram 1000. After a start condition 1006 has been transmitted by the master device 304, address bits 1028, 1030, 1032 are transmitted on the SDA wire 1002, and a series of short pulses 1008a, 1008b, 1008c may be transmitted on one or more occasions when the SCL wire 1004 is in a high logic state. For example, and as illustrated in the expanded view 1020, the short pulses may each have a duration of 40 ns and may be separated by a 40 ns low period yielding a clock period 1026 of 80 ns.

The SCL wire 1004 may be permitted to settle before a series of short pulses 1008a, 1008b, 1008c is transmitted. For example, after an I2C transition 1022 from a low logic state, the SCL wire 1004 may remain in the high logic state for a first period of time 1016 before the series of short pulses 1008b is transmitted. The duration of the first period of time 1016 may be determined by I2C specifications and may be defined as 200 ns, for example. The series of short pulses 1008b may be terminated before a next I2C transition 1024 from the high logic state to the low logic state. The SCL wire 1004 remains in the high logic state for a second period of time 1018 before the next I2C transition 1024 occurs. The duration of the second period of time 1018 may be determined by I2C specifications and may, in one example, be defined as 200 ns.

A functioning spike filter coupled to the SCL wire 1004 suppresses each series of short pulses 1008a, 1008b, 1008c and the output of the spike filter includes only the I2C transitions (e.g., the transitions 1022, 1024). In the example illustrated in FIG. 10, the output of an effective spike filter coupled to the SCL wire 1004 is approximately a square wave with a period of 10 µs.

Other configurations of signaling can be used as test transmissions to test the efficacy of spike filters in a legacy I2C device 306, 308, 310, 312. Test transmissions typically merge perturbations onto a command or data word transmitted in accordance with an I2C protocol. These perturbations may include pulses and/or spikes that have a duration less than 50 ns. In some instances, a test transmission may include perturbations that affect both the high state and the low state of a signal transmitted over serial bus. For example, an I2C command or data word may be merged with one or more series of the series of short pulses 908a, 908b, 908c illustrated in FIG. 9 and one or more of the series of short pulses 1008a, 1008b, 1008c illustrated in FIG. 10.

Perturbation pulses, such as the pulses provided in a series of short pulses 908a, 908b, 908c, 1008a. 1008b, 1008c may be adapted to have any desired duty cycle. Some spike filters may become non-functional when the duty cycle is modified to a point where the spike filter cannot recover sufficiently between pulses. Varying the duty cycle may provide additional information that may be used to determine a maximum clocking rate for enhanced operation of a shared bus. The position of the perturbation pulses within a series of short pulses 908a, 908b, 908c. 1008a, 1008b, 1008c may be adapted or varied to provide additional information related to the operation of a spike filter. For example, varying the positioning of the perturbation pulses may provide additional information that may be used to determine a maximum clocking rate for enhanced operation of a shared bus arrives.

During spike filter testing, a message is transmitted on the SDA wire 902, 1002. The message may be selected from any available command word or other message that requires an I2C compliant or compatible slave device to respond. The effectiveness of the spike filter in the slave device when perturbation pulses are transmitted on the SCL wire 904, 1004 may be determined based on whether the slave device responds correctly to the message.

An I2C command may be included in a test transmission in order to cause a legacy I2C device 306, 308, 310, 312 to respond when the command or data word is recognized in accordance with I2C protocols by the legacy I2C device 306, 308, 310, 312. A response may include acknowledging the transmission, and/or reading or writing a register, for example. Any command or message may be used as a basis for a test transmission when a legacy I2C device 306, 308, 310, 312 is required to respond to such command or message. Such a command or message, or part thereof, may be referred to herein as a "command word."

FIGS. 9 and 10 illustrate the use of a slave address call as a command word (see also, FIG. 6). According to the I2C Specifications, legacy I2C devices 306, 308, 310, 312 are required to respond to a slave address call. However, any combination of transmissions to which a legacy I2C device 306, 308, 310, 312 is required to respond may be used as the basis for a test transmission. For example, perturbations may be merged with a command that follows the slave address, and/or merged into a data word that follows a command to write to a certain register within the legacy I2C device 306, 308, 310, 312. Other transactions may be employed to test the efficacy or effectiveness of the spike filter.

In one example, the master device 304 may transmit a byte to be written to an internal register of a legacy I2C device 306, 308, 310, 312. The master device 304 may read back the byte from the internal register in the same transaction. The master device 304 may repeat the transaction using modified signaling to write and read a different byte to the same internal register. The modified signaling may have perturbations inserted or merged onto one or both wires of the serial bus. If the read-back returns an incorrect byte, then the spike filter may be considered ineffective and/or unable to produce the desired result of filtering spikes or short pulses. If the read-back returns a correct byte, then the spike filter may be considered to be effective and the master device 304 may determine that the target legacy I2C device 306, 308, 310, 312 is capable of coexistence with enhanced devices 314, 316.

In some instances, the latter example may be modified such that the master device 304 writes a byte to an internal register without merging short pulses into the signaling. The master device 304 may then transmit signaling with short pulses merged therein to read back the byte from the internal register. Accordingly, there are many variations and combinations of I2C transactions that may be used to test a spike filter, whereby perturbations in the form of short pulses for example, may be inserted or merged at any point in the I2C transactions.

Figure 11:
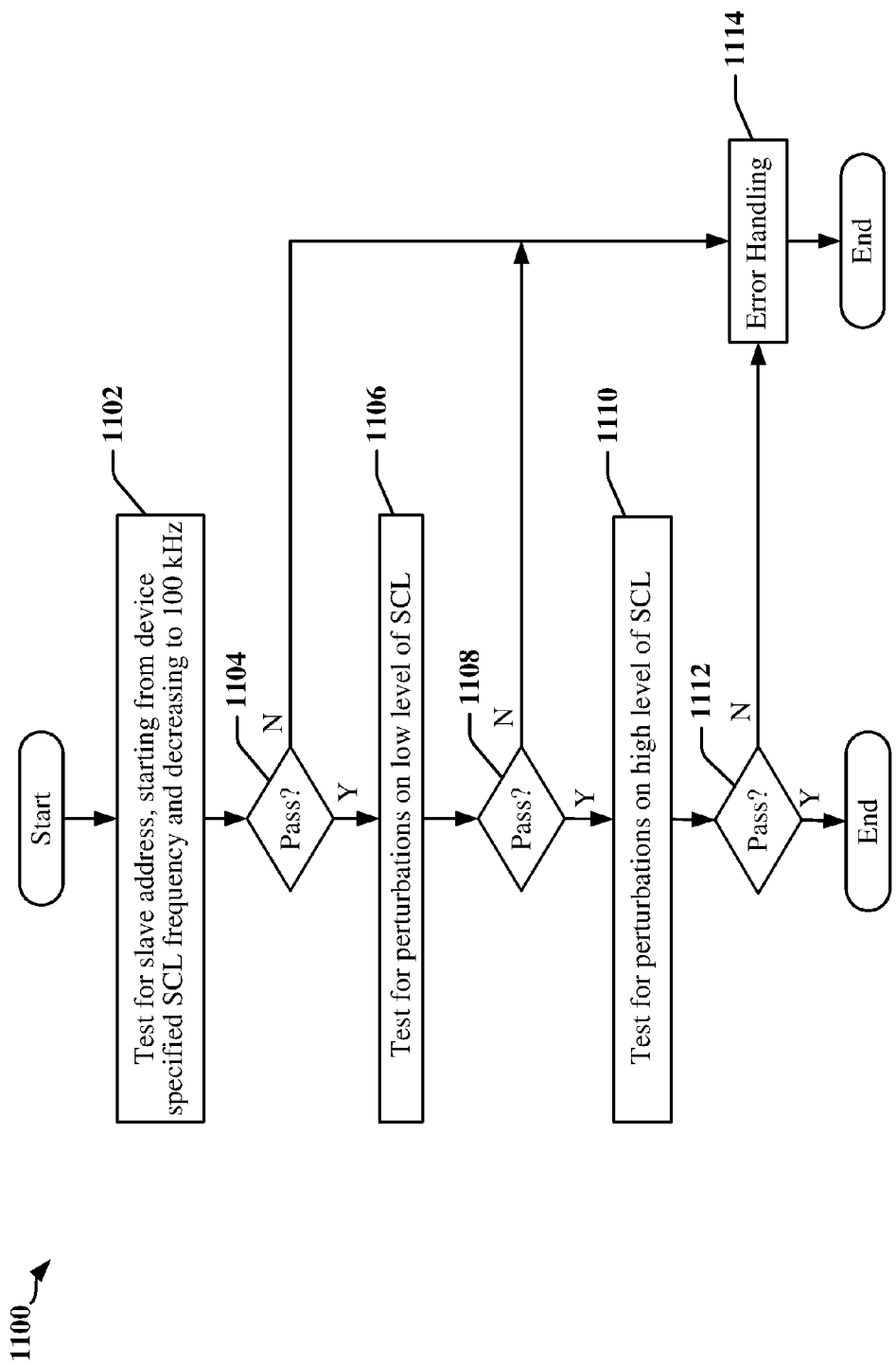
FIG. 11 illustrates a process for testing the spike filters in legacy I2C devices in accordance with certain aspects disclosed herein.

FIG. 11 is a flowchart illustrating a process for testing the spike filters in legacy I2C devices 306, 308, 310, 312. A master device may test the effectiveness of a spike filter in a slave device by sending a series of commands under different clocking conditions to the slave device while introducing pulses or other perturbations on clock signal transmitted on the SCL wire 904, 1004. Each command may be preceded by a start condition or a repeated condition followed by a seven-bit address and Write command bit. The spike filter in the slave device may be deemed to be effective for the current clocking condition if the master device detects an ACK on the SDA wire 902, 9004 after the Write bit has been transmitted. The process may employ the signaling illustrated in FIGS. 9 and 10, for example.

At block 1102, the master device 304 may determine if a legacy I2C device 306, 308, 310, 312 is present on the bus. The master device 304 may determine presence of a legacy slave device 306, 308, 310, 312 by transmitting the slave address at a clock rate appropriate for the slave device 306, 308, 310, 312. For example, the master device 304 may initially transmit the slave address at a clock rate of 1 MHz (I2C Fm+), and may determine if an acknowledgment has been received from the slave device 306, 308, 310, 312. An acknowledgment indicates presence of the slave device 306, 308, 310, 312. If no acknowledgment is received, the master device 304 may transmit the slave address at one or more lower clock rates until an acknowledgment is received. The lower clock rates may correspond to clock rates specified by I2C protocols and may include, for example, 400 kHz (I2C Fm) and 100 kHz (I2C Sm) clock rates.

In one example, the master device 304 commences spike filter testing with the highest frequency at which the slave device 306, 308, 310, 312 is capable of operating. For example, the highest frequency may be 1 MHz. In another example, the highest frequency may be 400 kHz. If the slave device 306, 308, 310, 312 fails to respond at its designated maximum frequency, then the master device 304 detects a NACK on the SDA wire 902, 1002 and determines that the slave device 306, 308, 310, 312 is defective. The use of the 100 kHz frequency, as described in the examples related to FIGS. 9 and 10, provides longer durations of the high and low signaling states in which perturbations are inserted or merged. In some instances, the master device 304 may merge short pulses with signaling transmitted at frequencies higher than 100 kHz.

At block 1104, it may be determined whether an acknowledgment has been received in block 1102. If the master device 304 detects a NACK on the SDA wire 902, 1002 after transmission at the lower clock rates, the master device 304 may determine that an error has occurred and control may be passed to block 1114 for error handling procedures. Otherwise, the procedure continues at block 1106.

At block 1106, the master device 304 may select the 100 kHz clock rate, which may be commonly supported by legacy slave devices 306, 308, 310, 312. The master device 304 may then transmit the slave address at the selected clock rate with short pulses inserted in the low logic states of the SCL wire 904, is illustrated in FIG. 9. The spike filter of the slave device 306, 308, 310, 312 is expected to suppress the short pulses. The legacy slave device 306, 308, 310, 312 recognizes the slave address when the short pulses are suppressed, and transmits some acknowledgment to the master device 304. If the spike filter in the legacy slave device 306, 308, 310, 312 is unable to suppress the short pulses, then the legacy slave device 306, 308, 310, 312 may detect an additional transition on the SCL wire 904, and/or the SCL wire 904 may be stuck in the high state. In either case, the legacy slave device 306, 308, 310, 312 decodes the address incorrectly and does not provide an acknowledgment to the command.

At block 1108, the master device 304 determines whether an acknowledgment has been received from the legacy slave device 306, 308, 310, 312. If no acknowledgment has been received, the master device 304 detects a NACK on the SDA wire 902, 1002 and determines that an error has occurred and control may be passed to block 1114 for error handling procedures. Otherwise the procedure continues at block 1110.

At block 1110, the master device 304 may select the 100 kHz clock rate, which may be commonly supported by legacy slave devices 306, 308, 310, 312. The master device 304 may then transmit the slave address at the selected clock rate with short pulses inserted in the high logic states of the SCL wire 1004, is illustrated in FIG. 10. The spike filter of the slave device 306, 308, 310, 312 is expected to suppress the short pulses. The legacy slave device 306, 308, 310, 312 recognizes the slave address when the short pulses are suppressed, and transmits some acknowledgment to the master device 304. If the spike filter in the legacy slave device 306, 308, 310, 312 is unable to suppress the short pulses, then the legacy slave device 306, 308, 310, 312 may detect an additional transition on the SCL wire 1004, and/or the SCL wire 1004 may be stuck in the high state. In either case, the legacy slave device 306, 308, 310, 312 decodes the address incorrectly and does not provide an acknowledgment to the command.

At block 1112, the master device 304 determines whether an acknowledgment has been received from the legacy slave device 306, 308, 310, 312. If no acknowledgment has been received, the master device 304 detects a NACK on the SDA wire 902, 1002 and determines that an error has occurred and control may be passed to block 1114 for error handling procedures. Otherwise, it may be concluded that there is an increased degree of confidence that the legacy slave device 306, 308, 310, 312 has an appropriately designed 50 ns spike suppression filter.

In some instances, the master device 304 may configure one or more delays for the purposes of testing. The delays may be implemented to control the duration of periods of time 914, 916, 1016, 1018 between commencement or termination of a series of short pulses 908a, 908b, 908c, 1008a, 1008b, 1008c and a transition 922, 924, 1022, 1024 on the SCL wire 904, 1004. For example, the master device 304 may provide a 200 ns period of time 914, 916, 1016, 1018 when operating at 100 kHz speed. The duration of the period of time 914, 916, 1016, 1018 may be configured in accordance with the frequency of the clock transmitted on the SCL wire 904, 1004, or for other reasons.

Other test procedures and combinations of signaling may be used to test the spike suppression filter in legacy slave devices 306, 308, 310, 312. For example, short pulses may be added to both the low logic state and the high logic state on the SCL wire 904, 1004. In another example, the spacing and duration of the short pulses may be altered, and/or provided according to a predefined pattern.

Figure 12:
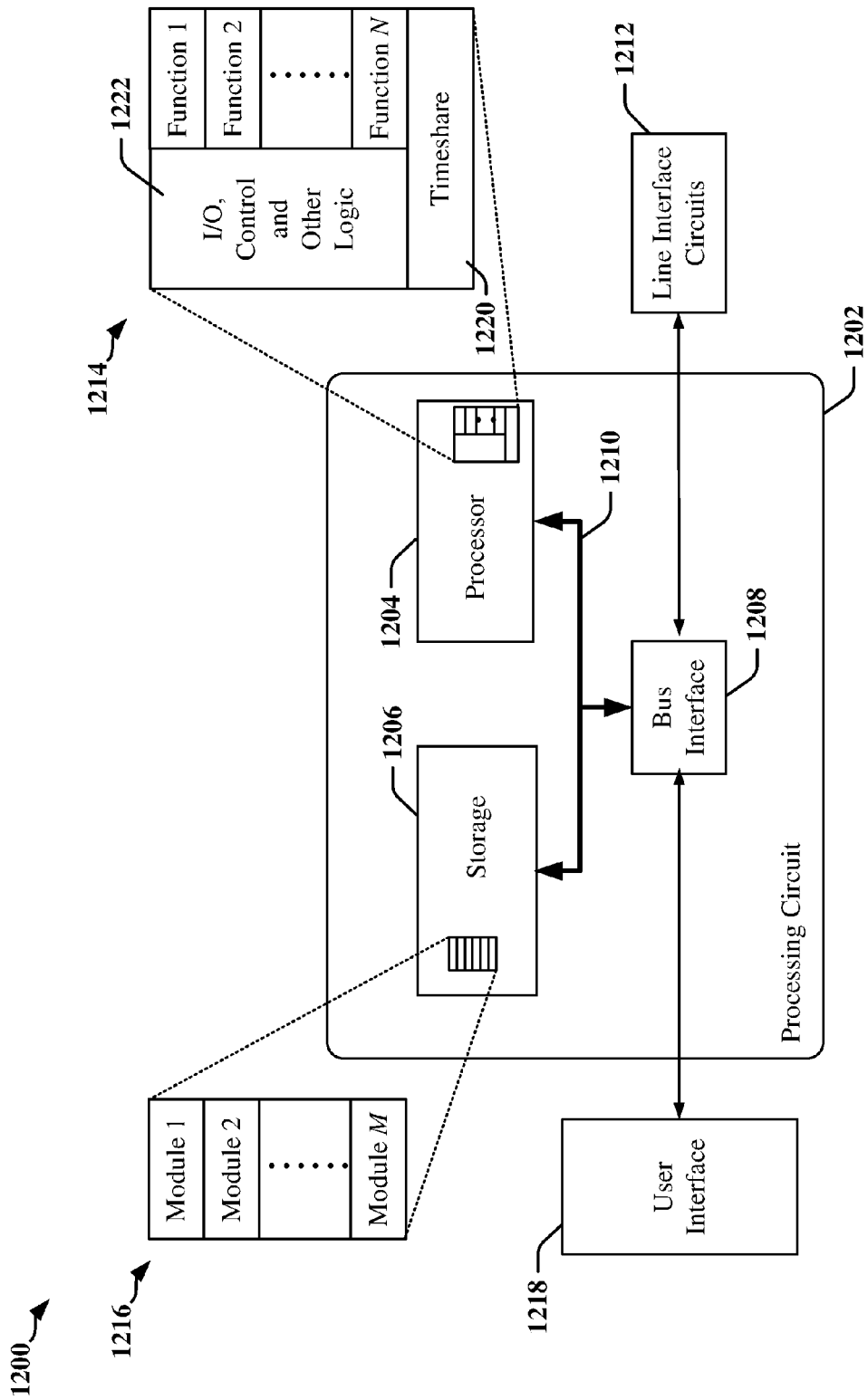
FIG. 12 illustrates an example of a hardware implementation for a receiving apparatus that communicates over an I2C bus according to one or more aspects disclosed herein.

FIG. 12 is a conceptual diagram illustrating a simplified example of a hardware implementation for an apparatus 1200 employing a processing circuit 1202 that may be configured to perform one or more functions disclosed herein. In accordance with various aspects of the disclosure, an element, or any portion of an element, or any combination of elements as disclosed herein may be implemented using the processing circuit 1202. The processing circuit 1202 may include one or more processors 1204 that are controlled by some combination of hardware and software modules. Examples of processors 1204 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 1204 may include specialized processors that perform specific functions, and that may be configured, augmented or controlled by one of the software modules 1216. The one or more processors 1204 may be configured through a combination of software modules 1216 loaded during initialization, and further configured by loading or unloading one or more software modules 1216 during operation.

In the illustrated example, the processing circuit 1202 may be implemented with a bus architecture, represented generally by the bus 1210. The bus 1210 may include any number of interconnecting buses and bridges depending on the specific application of the processing circuit 1202 and the overall design constraints. The bus 1210 links together various circuits including the one or more processors 1204, and storage 1206. Storage 1206 may include memory devices and mass storage devices, and may be referred to herein as computer-readable media and/or processor-readable media. The bus 1210 may also link various other circuits such as timing sources, timers, peripherals, voltage regulators, and power management circuits. A bus interface 1208 may provide an interface between the bus 1210 and one or more transceivers 1212. A transceiver 1212 may be provided for each networking technology supported by the processing circuit. In some instances, multiple networking technologies may share some or all of the circuitry or processing modules found in a transceiver 1212. Each transceiver 1212 provides a means for communicating with various other apparatus over a transmission medium. Depending upon the nature of the apparatus, a user interface 1218 (e.g., keypad, display, speaker, microphone, joystick) may also be provided, and may be communicatively coupled to the bus 1210 directly or through the bus interface 1208.

A processor 1204 may be responsible for managing the bus 1210 and for general processing that may include the execution of software stored in a computer-readable medium that may include the storage 1206. In this respect, the processing circuit 1202, including the processor 1204, may be used to implement any of the methods, functions and techniques disclosed herein. The storage 1206 may be used for storing data that is manipulated by the processor 1204 when executing software, and the software may be configured to implement any one of the methods disclosed herein.

One or more processors 1204 in the processing circuit 1202 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1206 or in an external computer-readable medium. The external computer-readable medium and/or storage 1206 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 1206 may also include, by way of example, a carrier wave, a transmission line, and any other suitable medium for transmitting software and/or instructions that may be accessed and read by a computer. Computer-readable medium and/or the storage 1206 may reside in the processing circuit 1202, in the processor 1204, external to the processing circuit 1202, or be distributed across multiple entities including the processing circuit 1202. The computer-readable medium and/or storage 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1206 may maintain software maintained and/or organized in loadable code segments, modules, applications, programs, etc., which may be referred to herein as software modules 1216. Each of the software modules 1216 may include instructions and data that, when installed or loaded on the processing circuit 1202 and executed by the one or more processors 1204, contribute to a run-time image 1214 that controls the operation of the one or more processors 1204. When executed, certain instructions may cause the processing circuit 1202 to perform functions in accordance with certain methods, algorithms and processes described herein.

Some of the software modules 1216 may be loaded during initialization of the processing circuit 1202, and these software modules 1216 may configure the processing circuit 1202 to enable performance of the various functions disclosed herein. For example, some software modules 1216 may configure internal devices and/or logic circuits 1222 of the processor 1204, and may manage access to external devices such as the transceiver 1212, the bus interface 1208, the user interface 1218, timers, mathematical coprocessors, and so on. The software modules 1216 may include a control program and/or an operating system that interacts with interrupt handlers and device drivers, and that controls access to various resources provided by the processing circuit 1202. The resources may include memory, processing time, access to the transceiver 1212, the user interface 1218, and so on.

One or more processors 1204 of the processing circuit 1202 may be multifunctional, whereby some of the software modules 1216 are loaded and configured to perform different functions or different instances of the same function. The one or more processors 1204 may additionally be adapted to manage background tasks initiated in response to inputs from the user interface 1218, the transceiver 1212, and device drivers, for example. To support the performance of multiple functions, the one or more processors 1204 may be configured to provide a multitasking environment, whereby each of a plurality of functions is implemented as a set of tasks serviced by the one or more processors 1204 as needed or desired. In one example, the multitasking environment may be implemented using a timesharing program 1220 that passes control of a processor 1204 between different tasks, whereby each task returns control of the one or more processors 1204 to the timesharing program 1220 upon completion of any outstanding operations and/or in response to an input such as an interrupt. When a task has control of the one or more processors 1204, the processing circuit is effectively specialized for the purposes addressed by the function associated with the controlling task. The timesharing program 1220 may include an operating system, a main loop that transfers control on a round-robin basis, a function that allocates control of the one or more processors 1204 in accordance with a prioritization of the functions, and/or an interrupt driven main loop that responds to external events by providing control of the one or more processors 1204 to a handling function.

Figure 13:
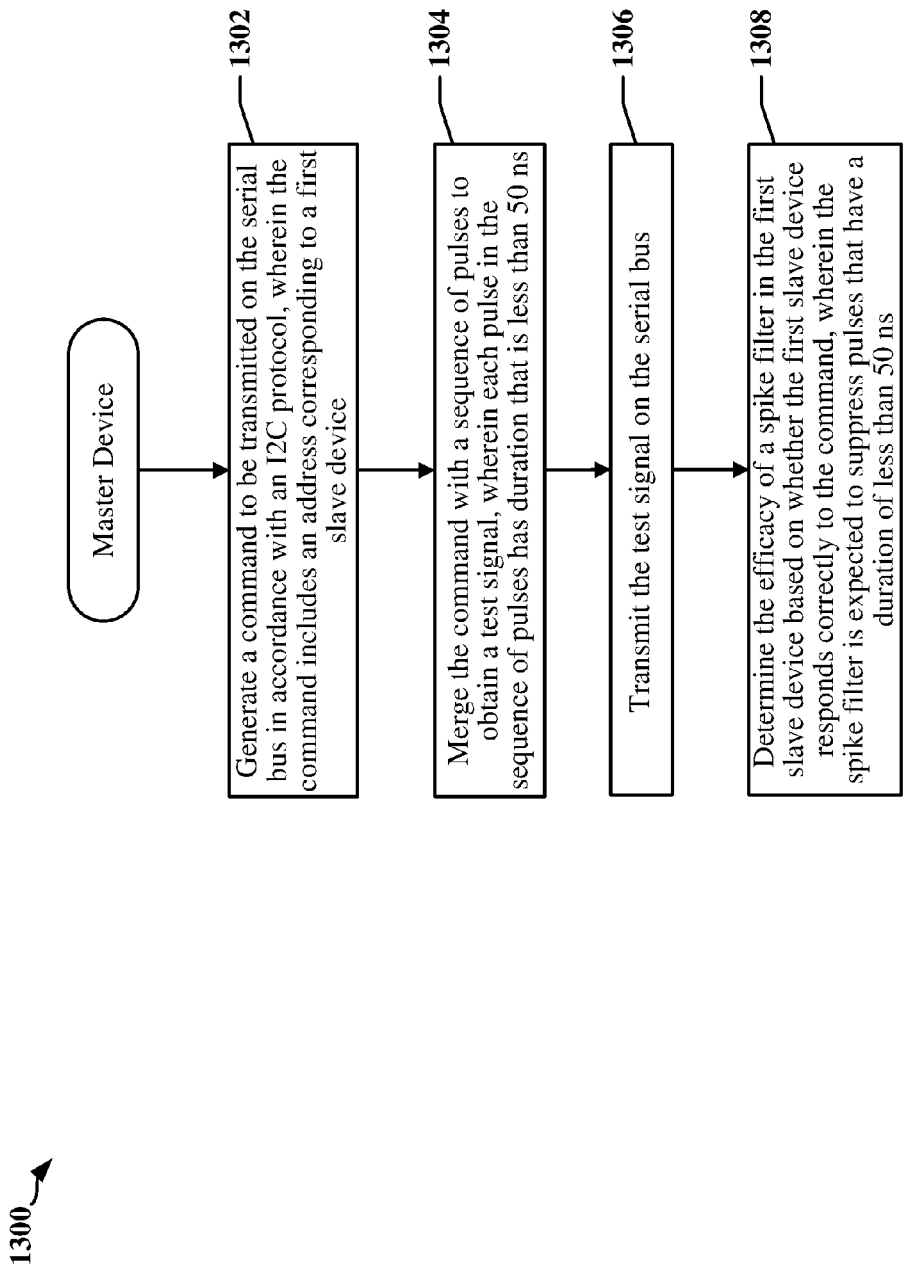
FIG. 13 is a flow chart of a method for detecting capabilities of devices coupled to a serial bus according to one or more aspects disclosed herein.

FIG. 13 includes a flowchart 1300 illustrating a method for detecting capabilities of devices coupled to a serial bus. Various steps of the method may be performed by a master device 304 coupled to a serial bus.

At block 1302, the master device 304 may generate a command to be transmitted on the serial bus in accordance with an I2C protocol. The command may include an address corresponding to a first slave device.

At block 1304, the master device 304 may merge the command with a sequence of pulses to obtain a test signal. Each pulse in the sequence of pulses may have a duration that is less than 50 ns. In one example, the sequence of pulses may be merged into each of a plurality of intervals when a clock signal transmitted on the serial bus is in a low state. In another example, the sequence of pulses may be merged into each of a plurality of intervals when a clock signal transmitted on the serial bus is in a high state. In another example, the sequence of pulses may be merged into each of a plurality of intervals when a clock signal transmitted on the serial bus is in a low state and into each of a plurality of intervals when a clock signal transmitted on the serial bus is in a high state. In various examples, each pulse the sequence of pulses may have a high state that has a duration of 40 ns.

At block 1306, the master device 304 may transmit the test signal on the serial bus.

At block 1308, the master device 304 may determine the efficacy of a spike filter in the first slave device based on whether the first slave device responds correctly to the command. The spike filter is expected to suppress pulses that have a duration of less than 50 ns. The first slave device may respond correctly to the command by acknowledging the command. The master device 304 may determine the efficacy of the spike filter by causing a first value to be written to a register of the first slave device, reading a second value from the register in the first slave device, and determining that the spike filter is effective when the first value equals the second value.

In some examples, the master device 304 may determine the presence of the first device by transmitting the command at one or more clock frequencies without embedding the sequence of pulses. The first device may be configured to acknowledge the command when the first device is present on the serial bus and adapted for communicating using at least one of the one or more clock frequencies. For example, the master device 304 may transmit the command at 400 kHz to determine if the addressed slave device is functioning normally. If no response is received or determined, then the master device 304 may consider that the addressed slave device is not present, defective, or otherwise malfunctioning. If the addressed slave device responds correctly, the master device 304 may test the spike filter by embedding short pulses in a command word that is transmitted at a clock frequency corresponding to the lowest frequency of the one or more clock frequencies.

In some examples, the sequence of pulses is transmitted on the SCL wire of the serial bus. In some examples, the sequence of pulses is transmitted on the SDA wire of the serial bus. In some examples, a first sequence of pulses is transmitted on the SCL wire of the serial bus, and a second sequence of pulses is transmitted on the SDA wire of the serial bus.

Figure 14:
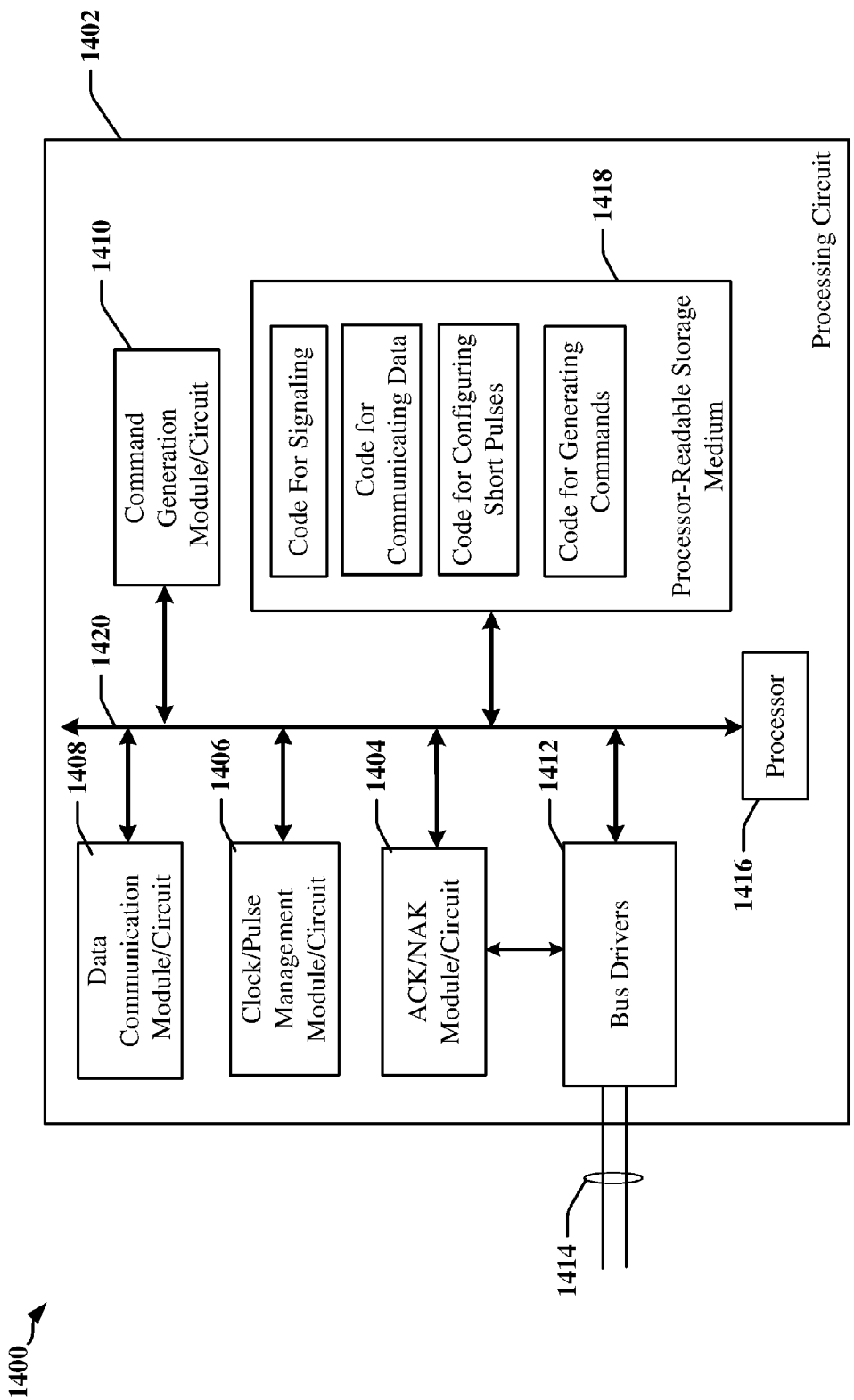
FIG. 14 illustrates an example of a hardware implementation for an apparatus employing a processing employing a processing circuit adapted according to certain aspects disclosed herein.

FIG. 14 is a diagram illustrating a simplified example of a hardware implementation for an apparatus 1400 employing a processing circuit 1402. The processing circuit typically has a processor 1416 that may include one or more of a microprocessor, microcontroller, digital signal processor, a sequencer and a state machine. The processing circuit 1402 may be implemented with a bus architecture, represented generally by the bus 1420. The bus 1420 may include any number of interconnecting buses and bridges depending on the specific application of the processing circuit 1402 and the overall design constraints. The bus 1420 links together various circuits including one or more processors and/or hardware modules, represented by the processor 1416, the modules or circuits 1404, 1406 and 1408, line interface circuits 1412 configurable to communicate over a serial bus 1414 that includes a plurality of connectors or wires, and the computer-readable storage medium 1418. The bus 1420 may also link various other circuits such as timing sources, peripherals, voltage regulators, and power management circuits, which are well known in the art, and therefore, will not be described any further.

The processor 1416 is responsible for general processing, including the execution of software stored on the computer-readable storage medium 1418. The software, when executed by the processor 1416, causes the processing circuit 1402 to perform the various functions described supra for any particular apparatus. The computer-readable storage medium 1418 may also be used for storing data that is manipulated by the processor 1416 when executing software, including data decoded from symbols transmitted over the serial bus 1414. The processing circuit 1402 further includes at least one of the modules 1404, 1406 and 1408. The modules 1404, 1406 and 1408 may be software modules running in the processor 1416, resident/stored in the computer-readable storage medium 1418, one or more hardware modules coupled to the processor 1416, or some combination thereof. The modules 1404, 1406 and 1408 may include microcontroller instructions, state machine configuration parameters, or some combination thereof.

In one configuration, the apparatus 1400 includes a module and/or circuit 1410 that is configured to generate a command to be transmitted on the serial bus 1414, a module and/or circuit 1406 that is configured to merge the command with a sequence of pulses to obtain a test signal, a module and/or circuit 1408 that is configured to transmit the test signal on the serial bus 1414, and modules and/or circuits 1404, 1408, 1416 configured to determine efficacy of a spike filter in the first slave device based on whether the first slave device acknowledges the test signal.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for detecting capabilities of devices coupled to a serial bus, comprising:
generating a command to be transmitted on the serial bus in accordance with an Inter-Integrated Circuit (I2C) protocol, wherein the command includes an address corresponding to a first slave device;
merging the command with a sequence of pulses to obtain a test signal, wherein each pulse in the sequence of pulses has a duration that is less than 50 nanoseconds;
transmitting the test signal on the serial bus; and
determining efficacy of a spike filter in the first slave device based on whether the first slave device responds correctly to the command,
wherein the spike filter is expected to suppress pulses that have a duration of less than 50 nanoseconds.

2. The method of claim 1, further comprising:
receiving an acknowledgement from the first slave device in response to the command, wherein the acknowledgement indicates that the spike filter in the first slave device is operating effectively.

3. The method of claim 1, wherein determining the efficacy of the spike filter comprises:
causing a first value to be written to a register of the first slave device;
reading a second value from the register in the first slave device; and
determining that the spike filter is effective when the first value equals the second value.

4. The method of claim 1, further comprising:
determining presence of the first slave device by transmitting the command at one or more clock frequencies without the sequence of pulses, wherein the first slave device is configured to acknowledge the command when the first device is present on the serial bus and adapted for communicating using at least one of the one or more clock frequencies.

5. The method of claim 4, wherein the test signal is transmitted at a clock frequency corresponding to a lowest frequency of the one or more clock frequencies.

6. The method of claim 1, wherein merging the command with the sequence of pulses comprises:
merging the sequence of pulses into each of a plurality of intervals when a clock signal transmitted on the serial bus is in a low state.

7. The method of claim 1, wherein merging the command with the sequence of pulses comprises:
merging the sequence of pulses into each of a plurality of intervals when a clock signal transmitted on the serial bus is in a high state.

8. The method of claim 1, wherein each pulse comprises a 40 nanosecond period of time during which the each pulse is in a high state.

9. The method of claim 1, wherein the sequence of pulses is transmitted on a serial clock line (SCL) of the serial bus.

10. The method of claim 1, wherein the sequence of pulses is transmitted on a serial data line (SDA) of the serial bus.

11. An apparatus coupled to a serial bus, comprising:
means for generating a command to be transmitted on the serial bus in accordance with an Inter-Integrated Circuit (I2C) protocol, wherein the command includes an address corresponding to a first slave device;
means for merging the command with a sequence of pulses to obtain a test signal, wherein each pulse in the sequence of pulses has a duration that is less than 50 nanoseconds;
means for transmitting the test signal on the serial bus; and
means for determining efficacy of a spike filter in the first slave device based on whether the first slave device responds correctly to the command,
wherein the spike filter is expected to suppress pulses that have a duration of less than 50 nanoseconds.

12. The apparatus of claim 11, wherein the means for determining efficacy is configured to:
receive an acknowledgement from the first slave device in response to the command; and
determine that spike filter in the first slave device is operating effectively based on receipt of the acknowledgement.

13. The apparatus of claim 11, wherein the means for determining the efficacy of the spike filter is configured to:
cause a first value to be written to a register of the first slave device;
read a second value from the register in the first slave device; and
determine that the spike filter is effective when the first value equals the second value.

14. The apparatus of claim 11, further comprising:
means for determining presence of the first slave device by transmitting the command at one or more clock frequencies without the sequence of pulses, wherein the first slave device is configured to acknowledge the command when the first slave device is present on the serial bus and when the first slave device is adapted for communicating using at least one of the one or more clock frequencies.

15. The apparatus of claim 14, wherein the test signal is transmitted at a clock frequency corresponding to a lowest frequency of the one or more clock frequencies.

16. The apparatus of claim 11, wherein the means for merging the command with the sequence of pulses is configured to:
merge the sequence of pulses into each of a plurality of intervals when a clock signal transmitted on the serial bus is in a low state.

17. The apparatus of claim 11, wherein the means for merging the command with the sequence of pulses is configured to:
merge the sequence of pulses into each of a plurality of intervals when a clock signal transmitted on the serial bus is in a high state.

18. The apparatus of claim 11, wherein each pulse comprises a 40 nanosecond period of time during which the each pulse is in a high state.

19. The apparatus of claim 11, wherein the sequence of pulses is transmitted on a serial clock line (SCL) of the serial bus.

20. The apparatus of claim 11, wherein the sequence of pulses is transmitted on a serial data line (SDA) of the serial bus.

21. An apparatus for detecting capabilities of devices coupled to a serial bus, comprising:
a processing system configured to:
generate a command to be transmitted on the serial bus in accordance with an Inter-Integrated Circuit (I2C) protocol, wherein the command includes an address corresponding to a first slave device;
merge the command with a sequence of pulses to obtain a test signal, wherein each pulse in the sequence of pulses has a duration that is less than 50 nanoseconds;
transmit the test signal on the serial bus; and
determine efficacy of a spike filter in the first slave device based on whether the first slave device responds correctly to the command,
wherein the spike filter is expected to suppress pulses that have a duration of less than 50 nanoseconds.

22. The apparatus of claim 21, wherein the first slave device responds correctly to the command by acknowledging the command.

23. The apparatus of claim 21, wherein the processing system is configured to:
cause a first value to be written to a register of the first slave device;
read a second value from the register in the first slave device; and
determine that the spike filter is effective when the first value equals the second value.

24. The apparatus of claim 21, wherein the processing system is configured to:
merge the sequence of pulses into each of a plurality of intervals when a clock signal transmitted on the serial bus is in a low state.

25. The apparatus of claim 21, wherein the processing system is configured to:
merge the sequence of pulses into each of a plurality of intervals when a clock signal transmitted on the serial bus is in a high state.

26. A non-transitory processor-readable storage medium comprising code for:
generating a command to be transmitted on a serial bus in accordance with an Inter-Integrated Circuit (I2C) protocol, wherein the command includes an address corresponding to a first slave device;
merging the command with a sequence of pulses to obtain a test signal, wherein each pulse in the sequence of pulses has a duration that is less than 50 nanoseconds;
transmitting the test signal on the serial bus; and
determining efficacy of a spike filter in the first slave device based on whether the first slave device responds correctly to the command,
wherein the spike filter is expected to suppress pulses that have a duration of less than 50 nanoseconds.

27. The processor-readable storage medium of claim 26, wherein the first slave device responds correctly to the command by acknowledging the command.

28. The processor-readable storage medium of claim 26, further comprising code for:
causing a first value to be written to a register of the first slave device;
reading a second value from the register in the first slave device; and
determining that the spike filter is effective when the first value equals the second value.

29. The processor-readable storage medium of claim 26, further comprising code for:

merging the sequence of pulses into each of a plurality of intervals when a clock signal transmitted on the serial bus is in a low state.

30. The processor-readable storage medium of claim 26, further comprising code for:
merging the sequence of pulses into each of a plurality of intervals when a clock signal transmitted on the serial bus is in a high state.

* * * * *